US008549106B2

(12) United States Patent
Howell et al.

(10) Patent No.: US 8,549,106 B2
(45) Date of Patent: Oct. 1, 2013

(54) LEVERAGING REMOTE SERVER POOLS FOR CLIENT APPLICATIONS

(75) Inventors: Jonathan R. Howell, Seattle, WA (US); Jeremy E. Elson, Kirkland, WA (US); John R. Douceur, Bellevue, WA (US); Jacob R. Lorch, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1081 days.

(21) Appl. No.: 12/484,356

(22) Filed: Jun. 15, 2009

(65) Prior Publication Data

US 2010/0318630 A1 Dec. 16, 2010

(51) Int. Cl.
*G06F 15/16* (2006.01)

(52) U.S. Cl.
USPC .......................................... 709/218; 709/203

(58) Field of Classification Search
USPC ............................................ 709/203, 218, 24
See application file for complete search history.

(56) References Cited

U.S. PATENT DOCUMENTS

| 6,553,409 | B1 | 4/2003 | Zhang et al. |
| 7,451,180 | B2 | 11/2008 | Warren et al. |
| 7,457,980 | B2 | 11/2008 | Yang et al. |
| 7,487,393 | B2 | 2/2009 | Archer et al. |
| 2004/0103218 | A1 | 5/2004 | Blumrich et al. |
| 2007/0124415 | A1 | 5/2007 | Lev-Ran et al. |
| 2009/0006808 | A1 | 1/2009 | Blumrich et al. |
| 2009/0144396 | A1* | 6/2009 | Walton .......................... 709/219 |
| 2009/0234903 | A1* | 9/2009 | Lomelli et al. ................. 709/201 |
| 2009/0240705 | A1* | 9/2009 | Miloushev et al. ............. 707/10 |

OTHER PUBLICATIONS

Barak, et al., "The MOSIX Distributed Operating System—Load Balancing for UNIX", Springer-Verlag, Lecture Notes in Computer Science, vol. 672, 1993, 221 pgs.
Foster, et al., "The Grid, Blueprint for a New Computing Infrastructure", Morgan Kaufmann Publishers, 1999, 677 pgs.
"Advanced Cluster Systems", retrieved on Apr. 14, 2009 at <<http://www.advancedclustersystems.com/ACS/Products.html>>, 2008 Advanced Cluster Systems, 1 page.
"Amazon Elastic Compute Cloud (Amazon EC2)", retrieved on Apr. 14, 2009 at <<http://aws.amazon.com/ec2>>, Amazon Web Services, 2009, 6 pages.
Anderson, et al., "A Case for NOW (Networks of Workstations)", retrieved on Apr. 20, 2009 at <<http://ieeexplore.ieee.org//stamp/stamp.jsp?tp=&arnumber=00342018>>, IEEE Micro, 1995, pp. 54-64.

(Continued)

*Primary Examiner* — El Hadji Sall
(74) *Attorney, Agent, or Firm* — Lee & Hayes, PLLC

(57) ABSTRACT

Techniques for enabling client computing devices to leverage remote server pools for increasing the effectiveness of applications stored on the client computing device are described herein. In some instances, the server pools comprise a "cloud", "cluster" or "data center" that comprises hundreds or thousands of servers connected together by a network that has an extremely low latency and high bandwidth relative to the network through which the client computing device connects to the server pool. The client computing device may request that the server pool perform a certain task for an application whose canonical state resides on the client. After computation of a result of the task, a server of the server pool then provides the result to the client. By doing so, the techniques dramatically increase the amount of resources working on the request of the client and, hence, dramatically increase the speed and effectiveness of the client-side application.

15 Claims, 11 Drawing Sheets

(56) References Cited

OTHER PUBLICATIONS

Anthes, "Sabre Flies to Open Systems", retrieved on Apr. 15, 2009 at <<http://www.computerworld.com/action/article.do?command=viewArticleBasic&articleId=93455>>, ComputerWorld Management, May 31, 2004, 5 pages.

Banks, "Web Services Resource Framework (WSRF)—Primer v1.2", retrieved on Apr. 13, 2009 at <<http://docs.oasis-open.org/wsrf/wsrf-primer-1.2-primer-cd-02.pdf>>, Committee Draft 02, May 23, 2006, copyright Oasis Open 2006, 45 pages.

Basu, et al., "Interactive Grid Architecture for Application Service Providers", retrieved on Apr. 13, 2009 at <<http://www.hpl.hp.com/techreports/2003/HPL-2003-84R1.pdf>>, Published in and presented at the International Conference on Web Services (ICWS 2003), Jun. 23-26, 2003, Las Vegas, NV., 8 pages.

Baude, et al., "Interactive and Descriptor-based Deployment of Object-Oriented Grid Applications", retrieved on Apr. 13, 2009 at <<http://ieeexplore.ieee.org/stamp/stamp.jsp?tp=&arnumber=1029907&isnumber=22121>>, Proceedings of the 11th IEEE International Symposium on High Performance Distributed Computing HPDC-11 2002 (HPDC 2002), 10 pages.

"Blender", retrieved on Apr. 14, 2009 at <<http://blender.org/>>, 1 page.

"Bordeaux1 Chinese Checkers", retrieved on Apr. 15, 2009 at <<http://sourceforge.net/projects/b1cc>>, SourceForge, Inc., 3 pages.

"Cinelerra-CV", retrieved on Apr. 14, 2009 at <<http://cinelerra.org/>>, 2 pages.

"Cluster Computing White Paper", retrieved on Apr. 13, 2009 at <<http://www.sai.syr.edu/~chapin/papers/pdf/ieee_tfcc_wp_clustercomputing.pdf>>, Final Release, Version 2.0, Univeristy of Portsmouth, UK, Dec. 28, 2000, 119 pages.

Coghlan, et al., "Int.eu.grid project approach on supporting interactive applications in grid environment", retrieved on May 4, 2009 at <<www.springerlink.com>>, from the book "Grid Enabled Remote Instrumentation", Springer, 2009, pp. 435-445.

Dean, et al., "MapReduce: Simplified Data Processing on Large Clusters", retrieved on Apr. 13, 2009 at <<http://labs.google.com/papers/mapreduce-osdi04.pdf>>, Google, Inc., to appear in OSDI 2004, pp. 1-13.

DeCandia, et al., "Dynamo: Amazon's Highly Available Key-value Store", retrieved on Apr. 13, 2009 at <<http://s3.amazonaws.com/AllThingsDistributed/sosp/amazon-dynamo-sosp2007.pdf>>, SOSP 2007, Oct. 14-17, 2007, Stevenson, WA., pp. 205-220.

Di Stefano, et al., "Supporting Interactive Application Requirements in a Grid Environment", retrieved on Apr. 13, 2009 at <<http://www.springerlink.com/content/vw6697p3k5052601/fulltex.pdf>>, pp. 377-391.

"EGEE Portal: Enabling Grids for E-sciencE", retrieved on Apr. 14, 2009 at <<http://www.eu-egee.org/>>, 1 page.

"Flexiscale—Utility Computing On-Demand", retrieved on Apr. 15, 2009 at <<http://www.flexiscale.com>>, xcalibre communications Ltd, 2007, 1 page.

Foster, et al., "The Open Grid Services Architecture, Version 1.5", retrieved on Apr. 13, 2009 at <<http://www.ogf.org/documents/GFD.80.pdf>>, GFD-I.080, Jul. 24, 2006, 65 pages.

Foster, "Globus Toolkit Version 4: Software for Service-Oriented Systems", retrieved on Apr. 13, 2009 at <<http://www.globus.org/alliance/publications/papers/IFIP-2005.pdf>>, NPC 2005, LNCS 3779, pp. 2-13, 2005.

"FUSE: Filesystem in Userspace", retrieved on Apr. 14, 2009 at <<http://fuse.sourceforge.net/>>, 3 pages.

Gray, et al., "Leases: An Efficient Fault-Tolerant Mechanism for Distributed File Cache Consistency", retrieved on Apr. 13, 2009 at <<ftp://reports.stanford.edu/pub/cstr/reports/cs/tr/90/1298/CS-TR-90-1298.pdf>>, Department of Computer Science, Stanford University, Jan. 1990, 12 pages.

Hellwagner, et al., "Enabling a PC Cluster for High Performance Computing", retrieved on Apr. 13, 2009 at <<http://citeseerx.ist.psu.edu/viewdoc/download?doi=10.1.1.47.2496&rep=rep1&type=pdf>>, 10 pages.

"High-Performance Computing for Financial Institutions", retrieved on Apr. 13, 2009 at <<http://www.cisco.com/web/strategy/docs/finance/hpc_for_financial_institutions.pdf>>, 2 pages.

Howard, et al., "Scale and Performance in a Distributed File System", retrieved on Apr. 13, 2009 at <<http://pages.cs.wisc.edu/~cs736-1/papers/afs.pdf>>, ACM Transactions on Computer Systems, vol. 6, No. 1, Feb. 1988, pp. 51-81.

Humphreys, et al., "Chromium: A Stream-Processing Framework for Interactive Rendering on Cluster", retrieved on Apr. 13, 2009 at <<http://graphics.stanford.edu/papers/cr/cr_lowquality.pdf>>, 10 pages.

"IBM High Availability Cluster Multiprocessing", retrieved on Apr. 15, 2009 at <<http://en.wikipedia.org/wiki/IBM_High_Availability_Cluster_Multiprocessing>>, from Wikipedia, last updated Jan. 30, 2009, 2 pages.

"Interactive European Grid Project", retrieved on Apr. 14, 2009 at <<http://www.i2g.eu/>>, 1 page.

"GLite—Lightweight Middleware for Grid Computing", retrieved on Apr. 14, 2009 at <<http://glite.web.cern.ch/glite/>>, EGEE, 1 page.

"Linux Advanced Routing & Traffic Control", retrieved on Apr. 15, 2009 at <<http://lartc.org/>>, 4 pages.

"Loki Render", retrieved on May 1, 2009 at <<http://sourceforge.net/projects/loki-render/>>, SourceForge.Net, 1 page.

Mann, et al., "DISCOVER: A Computational Collaboratory for Interactive Grid Applications", retrieved on Apr. 13, 2009 at <<http://www.caip.rutgers.edu/~vijay/c630gridbook02July12.pdf>>, Concurrency: Pract. Exper: 2002; 00:1-15, 17 page.

McClure, et al., "MOSIX: How Linux Clusters Solve Real World Problems", retrieved on Apr. 13, 2009 at <<http://www.mosix.org/pub/usenix.pdf>>, 8 pages.

Mellon, "Use of Cluster Computing in Simulation", retrieved on Apr. 15, 2009 at <<http://www.sisostds.org/webletter/siso/iss_3/art_77.htm>>, 5 pages.

Milojicic, et al., "Process Migration", retrieved on Apr. 13, 2009 at <<http://www.hpl.hp.com/personal/Dejan_Milojicic/pm7.pdf>>, Aug. 10, 1999, 49 pages.

"MPI: A Message-Passing Interface Standard Version 2.1", retrieved on Apr. 13, 2009 at <<http://www.mpi-forum.org/docs/mpi21-report.pdf>>, Message Passing Interface Forum, Jun. 23, 2008, 608 pages.

Muthitacharoen, et al., "A Low-bandwidth Network File System", retrieved on Apr. 13, 2009 at <<http://pdos.csail.mit.edu/~benjie/papers/lbfs:sosp01.pdf>>, MIT Laboratory for Computer Science and NYU Department of Computer Science, 14 pages.

Nuttall, "A brief survey of systems providing process or object migration facilities", retrieved on May 4, 2009 at <<http://portal.acm.org/citation.cfm?id=191541>>, ACM SIGOPS Operating Systems Review, vol. 28, 1994, pp. 64-80.

Ousterhout, et al., "The Sprite Network Operating System", retrieved on Apr. 13, 2009 at <<http://www.research.ibm.com/people/f/fdouglis/papers/sprite.pdf>>, IEEE Feb. 1988, pp. 23-36.

Pool, "distcc, a fast free distributed compiler", retrieved on Apr. 15, 2009 at <<http://distcc.samba.org/doc/Ica2004/distcc-Ica-2004.html>>, Dec. 2003, 11 pages.

Sandberg, et al., "Design and Implementation of the Sun Network File System", retrieved on Apr. 13, 2009 at <<http://www.eecs.harvard.edu/cs261/notes/sandberg-1985.pdf>>, Computer Science 261, Copyright 2005, pp. 1-3.

Smith, "A Survey of Progress Migration Mechanisms", retrieved on Apr. 13, 2009 at <<http://www.cis.upenn.edu/~jms/svy-pm.pdf>>, Computer Science Department, Columbia University, NY, May 22, 2001, 14 pages.

Sunderam, "PVM: A Framework for Parallel Distributed Computing", retrieved on Apr. 13, 2009 at <<https://eprints.kfupm.edu.sa/60095/1/60095.pdf>>, Department of Math and Computer Science, Emory University, Atlanta, GA, pp. 1-27.

Thain, et al., "Distributed Computing in Practice: The Condor Experience", retrieved on Apr. 13, 2009 at <<http://www.cs.wisc.edu/condor/doc/condor-practice.pdf>>, Concurrency: Pract. Exper. 2004; 0:0-20, 37 pages.

Thomas, "U.S.S. Enterprise Blender mesh, 2005", retrieved on May 4, 2009 at <<http://stblender.iindigo3d.com/meshes_startrek.html>>, 8 pages.

Tridgell, "Efficient Algorithms for Sorting and Synchronization", retrieved on Apr. 13, 2009 at <<http://www.samba.org/~tridge/phd_thesis.pdf>>, The Australian National University, Feb. 1999, 115 pages.

Westerlund, et al., "Arta- a free AFS client", retrieved on Apr. 13, 2009 at <<https://db.usenix.org/publications/library/proceedings/usenix98/freenix/arla2.ps>>, 4 pages.

Zaharia, et al., "Improving MapReduce Performance in Heterogeneous Environments", retrieved on Apr. 13, 2009 at <<http://www.cs.nyu.edu/srg/docs/osdi_late.pdf>>, University of California, Berkeley, 14 pages.

\* cited by examiner

LEVERAGING REMOTE SERVER POOLS FOR CLIENT APPLICATIONS

BACKGROUND

Large-scale server pools (also known as "clusters", "clouds" or "data centers") are becoming more and more prevalent in the world of data processing. Every day, new businesses take advantage of this technology by moving their applications "into the cloud". As such, when a customer of one of these businesses uses a computing device to interact with a respective business, the customer actually interacts with one or more servers of a server pool or cloud that the business has purchased or rented.

Businesses and customers receive numerous benefits from these emerging server pools, including increased capacity, responsiveness and speed. However, while existing techniques enable many small and large businesses to harness the power of these server pools, these techniques fail to enable the use of server pools in many other contexts.

SUMMARY

Techniques for leveraging remote server pools for computing results for output on client computing devices are described herein. For instance, an individual user operating a client computing device that stores both an application and the canonical state of the application may send a request to a server pool to perform some task for the application. In some instances, the client computing device (or simply "client device" or "client") may send this request via a high-latency, low-bandwidth network typical of a Wide Area Network (WAN) or other commonly used networks. The server pool or cloud, meanwhile, may comprise a large number of servers interconnected by a network that has substantially lower latency and a substantially higher bandwidth when compared with the network connecting the client device to the server pool.

In response to receiving the request from the client device, the server pool may compute a result of the task by communicating with the client device and by distributing the task to one or more servers of the server pool. In some instances, the techniques described herein limit the number of round-trip communications between the server pool and the client device as well as the size of the packages exchanged there between. Once the server pool completes computation of the result, the server pool may then send this result to the client device, which then outputs the result on the device. By computing this result in parallel with use of an enormous amount of resources in the form of the server pool, the techniques described herein enable an individual user operating a client device to leverage the power of the server pool to increase the effectiveness of (e.g., speed up) the client-side application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
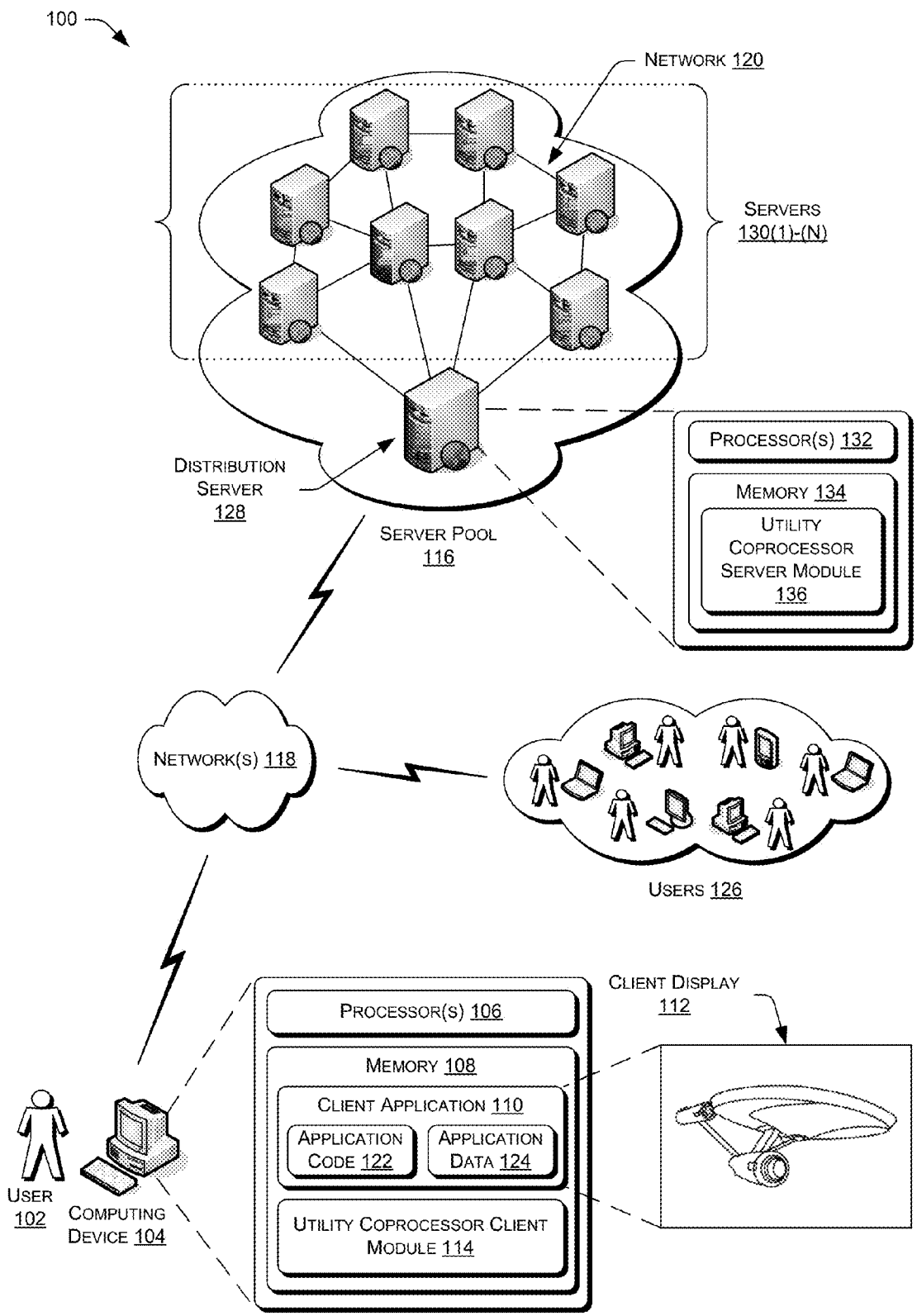
FIG. 1 illustrates an example computing architecture in which a user operating a client computing device storing an application and canonical state of the application sends a request to a distribution server of a server pool to perform a task for the application. In response, the distribution server may distribute the task as well as portions of the client-side application to multiple other servers of the server pool for computation of a result. After computing the result, the distribution server may provide the result to the client computing device for output by the client.

The disclosure describes techniques for enabling individual users operating client computing devices to leverage remote server pools for increasing the effectiveness of applications stored on the client computing device. In some instances, the server pools comprise a "cloud", "cluster" or "data center" that comprises hundreds or thousands of servers connected together by a network that has an extremely low latency and high bandwidth relative to the network through which the client computing device connects to the server pool.

As described herein, the client computing device may request that the server pool perform a certain task for an application whose canonical state resides on the client. As such, the client may provide the request (i.e., the user input) as well as code and data of the application to the server pool. With use of the request, the code and the data, a number of servers of the server pool essentially mirror the client computing device for long enough to perform or execute the requested task. After computation of a result of the task, a server of the server pool then provides the result to the client. By doing so, the techniques dramatically increase the amount of resources working on the request of the client and, hence, dramatically increase the speed and effectiveness of the client-side application.

To accomplish this outcome in a feasible manner, multiple techniques are used as described in detail below. The described techniques reduce both the number of round-trip communications between the client computing device as well as the size of such communications. In addition, the techniques may relax the traditional consistency model, may compress communications between the client and the server pool, and may use a particular identified server of the server pool to communicate with both the client as well as other servers of the server pool. The techniques also include optimizations on the client computing device itself by, for example, caching certain computations to avoid unnecessary re-computation of certain information. These techniques also deftly create proxies for processes that are remote to the client but that appear to the client-side applications to be local processes.

The discussion begins with a section entitled "Example Computing Architecture," which describes one non-limiting environment that may implement the described techniques. This section depicts and describes a high-level architecture, as well as illustrative components of a distribution server of the server pool and illustrative components of a client computing device. Next, a section entitled "Example Flow Diagrams" illustrates and describes the techniques in the context of a client computing device requesting to leverage the resources of a remote server pool. A third section, entitled "Example Processes", illustrates and describes example processes for leveraging server pools over a high-latency, low-bandwidth network to increase the effectiveness of a client-side application. A fourth section ("Additional Details of Example Techniques") follows and describes additional details of the described techniques illustrated in the example computing architecture and in the example flow diagrams and processes. Finally, the discussion ends with a brief conclusion.

This brief introduction, including section titles and corresponding summaries, is provided for the reader's convenience and is not intended to limit the scope of the claims, nor the proceeding sections.

Example Computing Architecture

FIG. 1 illustrates an example computer architecture 100 that may implement the described techniques for leveraging remote server pools to increase the effectiveness of applications stored on a client computing device. The architecture 100 includes a user 102 operating a client computing device 104 comprising one or more processors 106 and memory 108 to execute a client application 110. The client application 110 may comprise any sort of application, such as a drawing application, a game, a video editor or player or any other type of similar or different application. While FIG. 1 illustrates the client application 110 as being stored in memory 108, some or all of the client application 110 may reside remotely on a server in other implementations. In either instance, however, the canonical state of the client application 110 resides within or is otherwise controlled by the client computing device 104.

In some instances, the client application 110 comprises an application that, when executed locally, places a heavy computational load on the resources of the computing device 104. For instance, FIG. 1 illustrates that the client application 110 comprises a drawing application that the user 102 employs to create a drawing for presentation on a client display 112. In the instant example, at certain times while creating the drawing, the user 102 may choose to actually render and view his creation. Using traditional techniques of leveraging the processor 106 and the memory 108 of the client computing device 104, such an operation may cost an undue amount of computational resources and an undue amount of time.

Within the architecture 100, however, the computing device 104 may employ a utility coprocessor client module 114 to connect with a server pool 116 (also known as a "cloud", "cluster" or "data center") via a network 118 to help speed up the execution of the client application 110. Stated otherwise, when the user 102 wishes to, for example, render the drawing, the client computing device 104 may seek assistance from the massive resources of the server pool 116 to execute the required computations in a massively parallel fashion. By doing so, the time spent in rendering the drawing of the user may be substantially less than the time spent by traditional techniques.

The network 118 is representative of any one or combination of multiple different types of networks, interconnected with each other and functioning as a single large network (e.g., the Internet or an intranet). The network 118 may include wire-based networks (e.g., cable) and wireless networks (e.g., cellular, satellite, etc.). The network 118 may use any number of protocols and configurations to enable the computing device 104 to access other devices and resources.

In some instances, the network 118 comprises a high-latency, low-bandwidth network typical of many wire-based and wireless networks that individual users employ to access the Internet. For instance, the network 118 may comprise a Wide Area Network (WAN) or the like. The server pool 116, meanwhile, may comprise multiple servers interconnected locally via a network 120 that has a substantially lower latency (e.g., 2×, 10×, 100×, etc.) and/or a substantially higher bandwidth (e.g., 2×, 10×, 100×, etc.) than the network 118 used by the user 102 and the client device 104 to access the server pool 116. In some instances, the network 120 may comprise a Local Area Network (LAN) or the like.

As described in detail below, the described techniques enable efficient processing of a user request by the massive resources of the server pool 116 despite the existence of the high-latency, low-bandwidth network 118 residing in between the client device 104 and the server pool 116. Specifically, the utility coprocessor client module 114 provides both application code 122 and application data 124 (in addition to the task requested by the user 102) over the network 118 and to the server pool 116 for processing. By providing the code 122, the data 124 and the user input in the form of the request, one or more servers of the server pool 116 essentially mirror, or effectively become, the client computing device 104 for a limited period of time (i.e., during the processing of the request).

Then, when one or more other users 126 wish to leverage the server pool 116 (e.g., seconds, minutes, hours or days later), the described techniques result in certain servers of the server pool 116 mirroring the respective client computing devices of the requesting users. The described techniques, thus, are application-independent. They effectively transform each client application (such as the client application 110) from software into an efficient, highly parallel application service targeted at a single user with use of the massive resources available via the server pool 116.

The server pool 116 comprises a distribution server 128 and one or more other servers 130(1), 130(2), ..., 130(N), all of which connect together via the network 120. The distribution server 128 functions to communicate with the client computing device 104 as well as with the other servers 130(1)-(N) of the server pool 116. As illustrated, the distribution server 128 comprises one or more processors 132 and memory 134, which stores or otherwise has access to a utility coprocessor server module 136.

The utility coprocessor server module 136 functions to efficiently receive and process a request from the client computing device for the purpose of providing a result for the request to the client device for output by the client device. In addition or in the alternative, the client computing device may create and/or upload a file in response to receiving a result, or may take any other action that a client computing device may typically take in response to generating or receiving a result. In the illustrated example, the module 136 of the distribution server 128 receives a request from the user 102 to, for example, help create a rendering of the illustrated drawing for presentation on the client display 112. As discussed in detail below, the distribution server 128 (with use of module 136) then engages in an efficient series of communications with the client computing device 104 to obtain any needed application code 122 and application data 124.

The module 136 also distributes this code, data and the request to one or more of the other servers 130(1)-(N), which then process the request in parallel to one another. Each of these servers then returns a result to the distribution server, which then provides the aggregated and final result to the client computing device 104 for output by the client. While FIG. 1 includes a single distribution server 128, other implementations may include multiple distribution servers (or multiple hierarchical layers of distribution servers), each of which may include servers depending there from. That is, other implementations may employ multiple distribution servers, each of which may have a relationship to other servers that is similar to the illustrated relationship between the distribution server 128 and the servers 130(1)-(N) of the server pool 116.

Within the architecture 100, the user 102 is able to efficiently invoke the assistance of a massive server pool 116 to perform computationally-intensive tasks on a client application, despite the existence of the high-latency, low-bandwidth network 118 residing between the server pool 116 and the client device 104. Having described one of many architectures that may employ the described techniques, FIGS. 2-3 illustrate, respectively, example components of the distribution server 128 and the client computing device 104 of FIG. 1.

Figure 2:
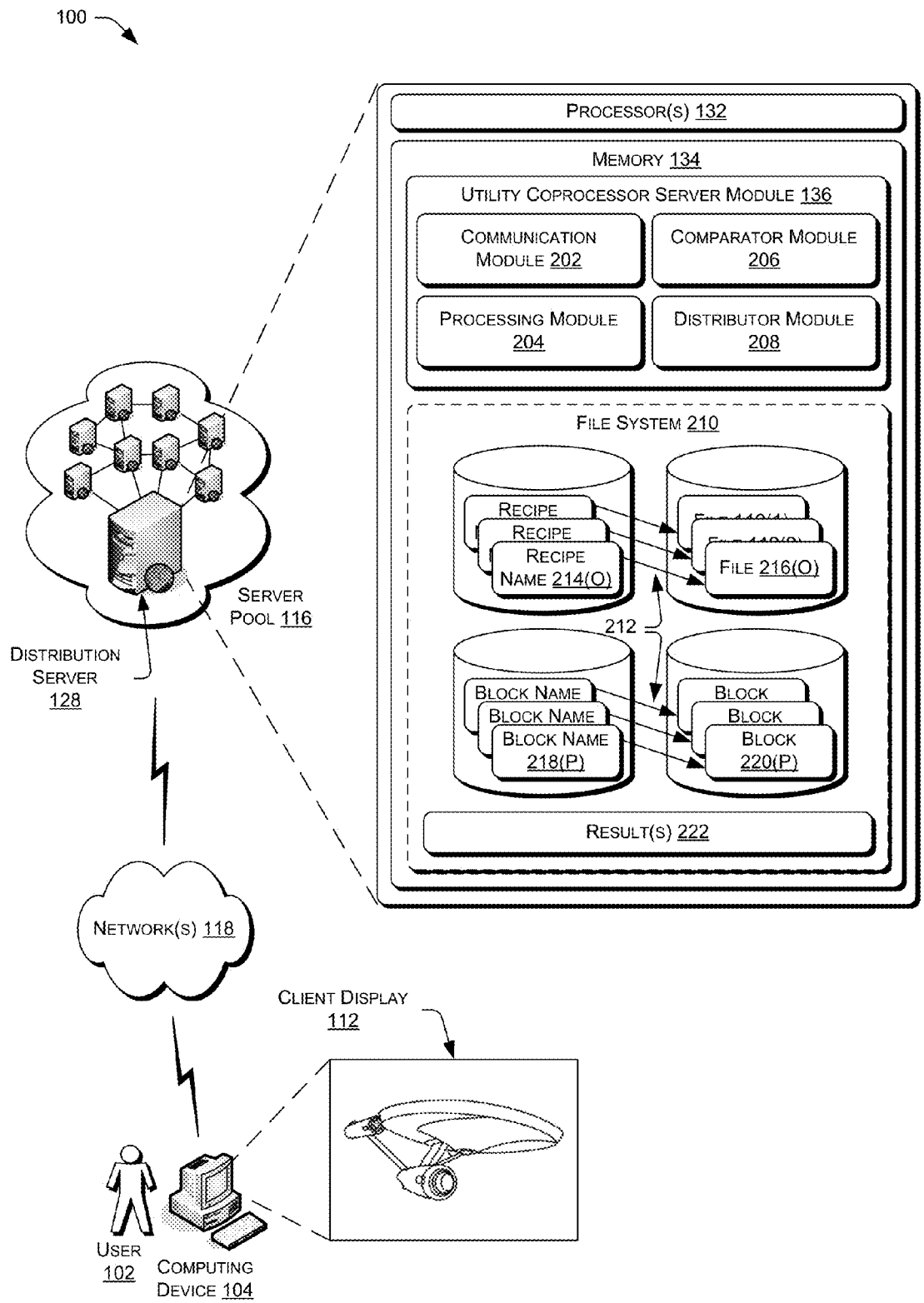
FIG. 2 is a block diagram of the distribution server of FIG. 1 in more detail. As illustrated, the distribution server includes a utility coprocessor server module for efficiently communicating with the client and for distributing the requested task to other servers of the server pool.
Figure 3:
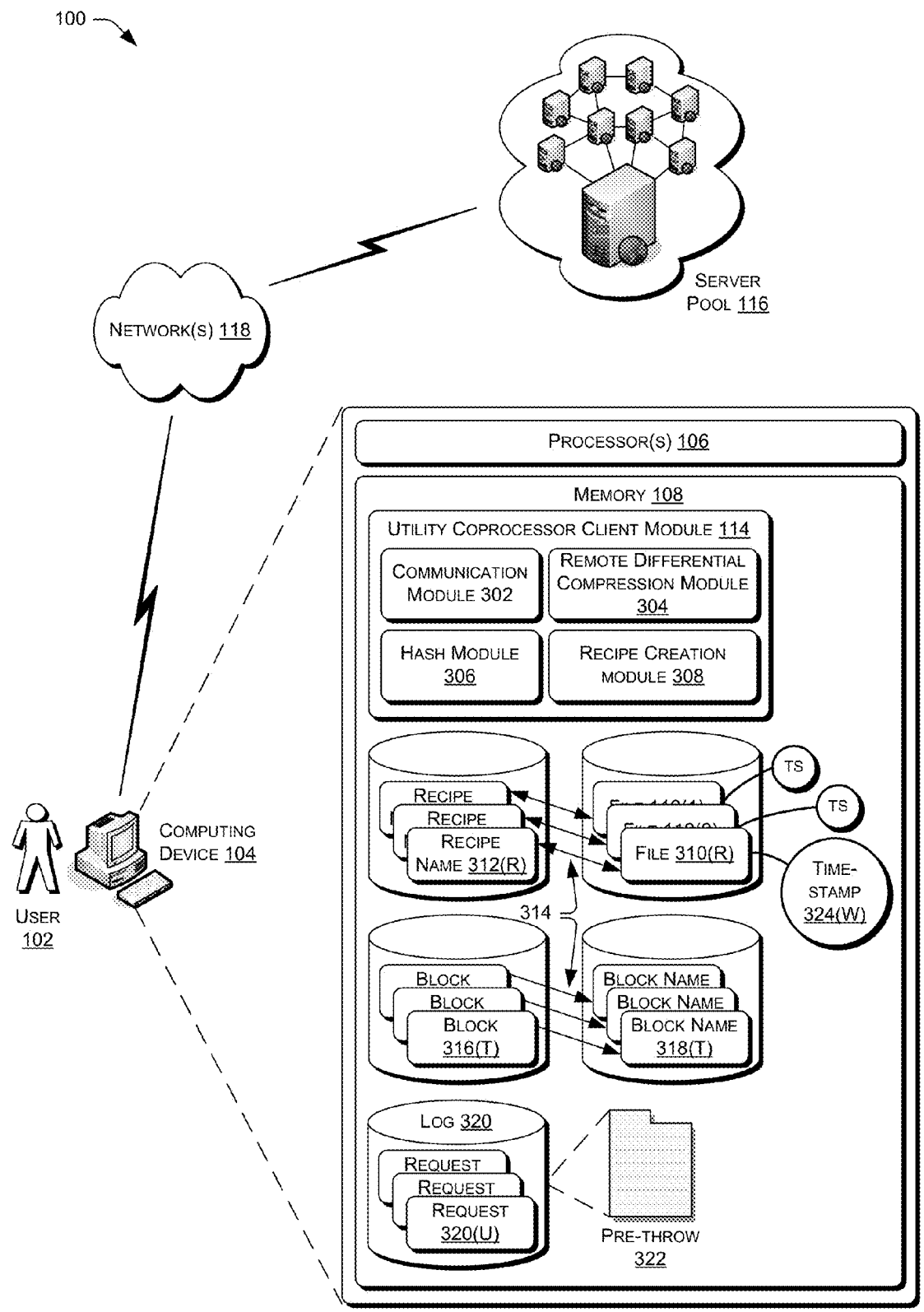
FIG. 3 is a block diagram of the client computing device of FIG. 1 in more detail. As illustrated, client computing device includes a utility coprocessor client module for sending requests to and efficiently communicating with the server pool.
Figure 4:
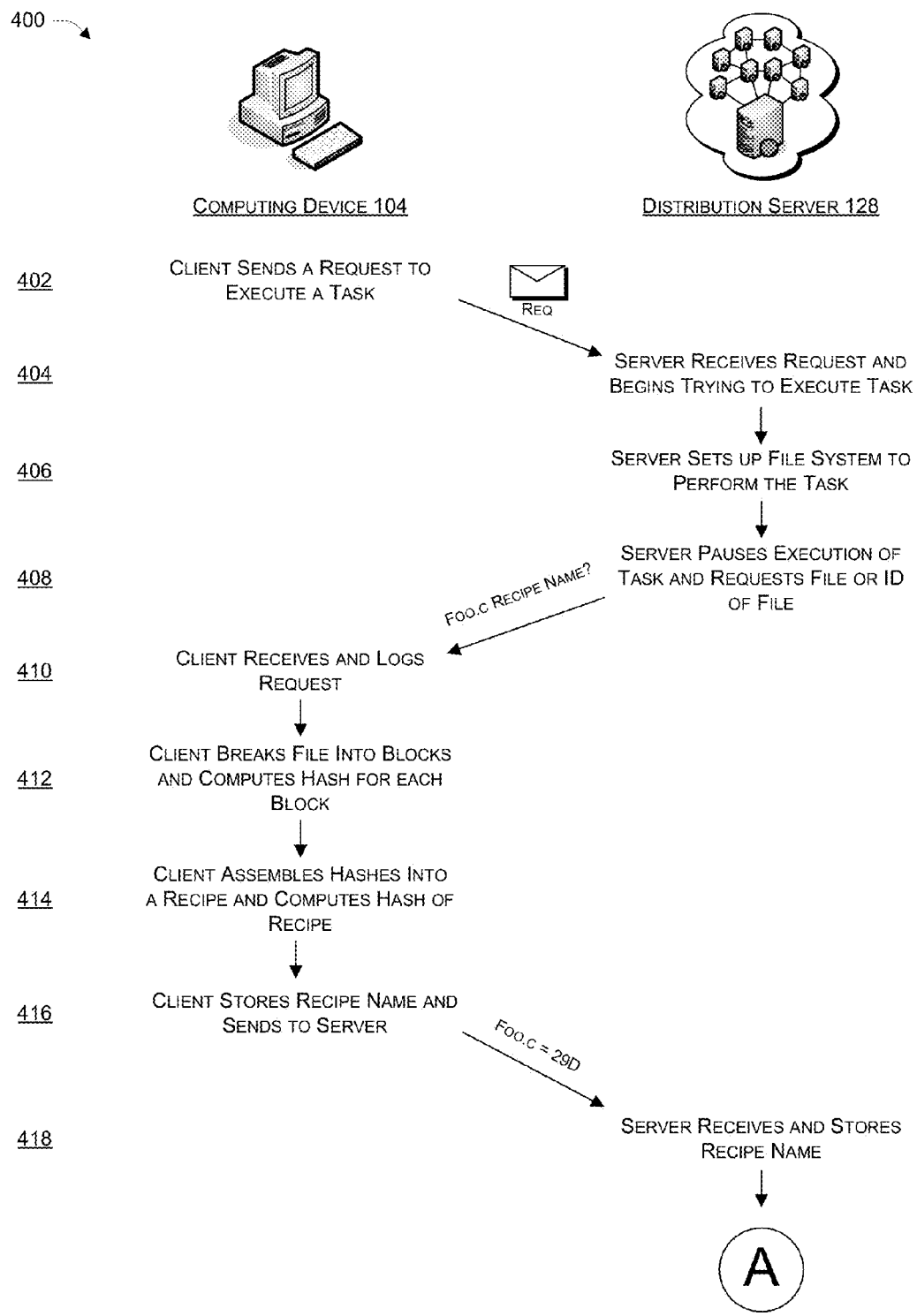
FIGS. 4-8 comprise a flow diagram illustrating an example process for enabling a client computing device running a client-side application to efficiently leverage a server pool over a relatively high-latency, low-bandwidth network utilizing the architecture of FIG. 1. Here, the client computing device limits the number of round-trip communications by providing a list of files that the server has previously requested at least twice.

FIG. 2 illustrates that the utility coprocessor server module 136 described with reference to FIG. 1 includes a communication module 202, a processing module 204, a comparator module 206 and a distributor module 208.

First, communication module 202 functions to communicate with client computing devices, such as client 104, as well as with other servers of the server pool 116. Using the example from above, the communication module 202 may receive a request to perform a task on behalf of, or along with, a client application, such as the client application 110. In response to receiving this request, the processing module 204 may set up a file system 210 of the server in which future computations may occur at the server pool 116.

Next, the processing module 204 may attempt to execute the request to, for example, render the drawing before realizing that the distribution server 128 (and, more specifically, the file system 210) does not have the proper code. That is, the server 128 will likely not have the code necessary to perform the requested task for the application, since the application resides on the client device 104. At this point, the processing module 204 pauses execution of the request and the communication module 202 asks the computing device 104 for the needed file(s).

In order to limit the size of the communications sent over the high-latency, low-bandwidth network 118, however, the client computing device 104 may refrain from simply automatically sending the requested files. Instead, the computing device 104 may send and the communication module 202 may receive an identifier of the requested file(s), which may comprise a hash value of the file or the like. For instance, the client computing device 104 may employ remote differential compression (RDC) techniques to break a file into multiple blocks. The client may then compute hash of each block of the file (labeled a "block name" for convenience), create an assembly of these hash values (labeled a "recipe" for convenience), and compute a hash of this recipe (labeled a "recipe name" for convenience). As such, as opposed to providing a file, the client computing device 104 may provide a recipe name to the distribution server 128, which is likely many orders of magnitude smaller than the file.

In response to receiving this identifier, the comparator module 206 may look into the file system 210 to determine if the distribution server 128 has already received this recipe name and, hence, if the distribution server 128 has already stored the corresponding file. As FIG. 2 also illustrates, the file system 210 may store a mapping 212 of one or more recipe names 214(1), 214(2), . . . , 214(O) to corresponding files 216(1), 216(2), . . . , 216(O). Therefore, the comparator module 206 may compare the received recipe name to the stored recipes names 214(1)-(O) to determine if the distribution server 128 stores a matching recipe name. If so, then the processing module 204 uses the mapping 212 to find the corresponding file and continues the execution of the task with use of the file. By doing so, the techniques would have saved valuable bandwidth and latency in that the file would not have to be transferred once more over the network 118. Now, the execution of the task resumes until another file is needed (at which point the process repeats, as described below).

If, however, the comparator module 206 determines that no matching recipe name can be found, then the communication module 202 may request the actual recipe (that is, the listing of the block names, each comprising a hash of the respective block). Again, by doing so, the techniques may save the bandwidth of having to send the actual blocks of code and/or data over the wire, if matching block names can be found.

In response to the request, the communication module 202 receives (from computing device 104) the requested recipe. The comparator module 206 then analyzes the file system 210 and, more specifically, any stored block names 218(1), 218(2), . . . , 218(P) to determine if a match exists for one or more of the blocks that the recipe specifies. For those block names of the recipe that match a stored block name 218(1)-(P), the processing module 204 uses the mapping 212 to find a block 220(1), 220(2), . . . , 220(P) corresponding to the matching block name. However, for those block names of the recipe that comparator module 206 does not find in the file system 210, the communication module 202 requests the actual code and/or data associated with the block name from the client computing device 104. In response, the client computing device 104 sends, and the communication module 202 receives, the corresponding block, which is then stored in the file system 210.

At some point, the distributor module 208 may distribute some or all of the received application code, data and the portions of the requested task ("sub-tasks") to one or more other servers of the server pool 116 for execution of the respective sub-task. These other servers return their individual results to the communication module 202 of distribution server 128, and the processing module 204 then aggregates these sub-task results into one or more results 222 of the requested task for storage in the file system 210. At this point, the communication module 202 then sends the result(s) 222 to the client computing device 104 for output by the client. Here, for instance, the client potentially displays the rendering of the drawing far sooner than if the client computing device 104 alone had created the rendering.

FIG. 3, meanwhile, illustrates example components of the client computing device 104 of FIGS. 1 and 2. The utility coprocessor client module 114 includes a communication module 302, a remote differential compression (RDC) module 304, a hash module 306 and a recipe creation module 308. The communication module 302 functions to efficiently and effectively communicate with the distribution server 128 of the server pool 116 in many of the ways discussed above. For instance, this module 302 sends the request to perform a certain task to the server pool 116, such as the rendering of the drawing of FIGS. 1 and 2.

The communication module 302 also receives requests for certain files from the distribution server 128, as discussed above. In response, the RDC module 304 may locate the requested file and may divide the requested file into multiple blocks. The hash module 306 may then compute and store a hash value of each of the blocks, while the recipe creation module 308 may aggregate each of these computed hash values to create a particular recipe. Finally, the hash module 306 may compute a hash of this recipe to create a recipe name, also as discussed above.

As FIG. 3 illustrates, the utility coprocessor client module 114 may store the computations discussed immediately above when the distribution server 128 requests one or more files 310(1), 310(2), . . . , 310(R). For instance, the module 114 may store recipe names 312(1), 312(2), . . . , 312(R) corresponding via a mapping 314 to each file 310(1)-(R). Additionally, the module 114 may store the actual blocks 316(1), 316(2), . . . , 316(T) in association with block names 318(1), 318(2), . . . , 318(T) via the mapping 314.

In addition, the utility coprocessor client module 114 may create a log 320 to store requests 320(1), 320(2), . . . , 320(U) received from the distribution server 320(U). That is, the log 320 may store each request for a particular file or identifier of a file (e.g., a request for a particular recipe name) received from the distribution server. By doing so, the module 114 may use the contents of the log 320 to create a pre-throw list 322. As discussed in more detail below, once the user 102 has sent a particular request for execution of a task to the server pool 116, the module 114 may thereafter send the pre-throw list 322 along with the request in order to reduce the number of round-trip communications between the distribution server 128 and the computing device 104 (over the network 118).

In some instances, the pre-throw list comprises a list of previously-requested recipe names. As such, upon receiving the list 322 along with a subsequent request, the distribution server 128 may consult the list each time that the distribution server needs a file. The server 128 can then find the recipe name associated with the needed file and check the contents of the file system 210 to determine if the file system 210 contains the needed recipe name, and hence, the needed file. If so, then the server 128 may simply use the stored file.

In some instances, the computing device 104 includes, on the pre-throw list 322, those recipe names that the distribution server has requested a single time. In other instances, however, the list 322 may include only those recipe names that the sever 128 has requested two times (or more) and, hence, is more likely to need again in the future. In either instance but particularly in the former, the distribution server 128 may inform the client computing device 104 if a "pre-thrown" recipe name was not needed. As such, the utility coprocessor client module 114 may remove the unused recipe name from the list to limit the size of the list 322 for future communications. In some instances, the module 114 may remove a recipe after one notification of non-use from the server, after multiple notifications, based on a ratio of pre-throws to non-use notifications, or in any other manner. In some instances, the module 114 is typically quick to add recipe names to the pre-throw list and slow to remove them from the list.

Additionally, note that while the following implementations describe the pre-throw list as including recipe names, it is to be appreciated that, in other implementations, the pre-throw lists may include block names in addition or in the alternative. In these implementations, the techniques may function, for the block names, in a manner similar to that described for the recipe names.

As discussed immediately above and as illustrated in FIG. 3, the client computing device 104 may store (e.g., cache) computed recipe names for potential future use. By doing so, the device 104 potentially saves itself from having to re-compute the recipe name associated with a file that the server has previously requested. However, each of these recipe names 312(1)-(R) corresponds to a file 310(1)-(R) as the file stood at a particular time. That is, when a file changes, so too does its blocks as well as the hashes of the blocks and, as such, the hash value of the recipe. Therefore, each of the recipe names corresponds to a particular version of the file, as represented by a timestamp 324(1), 324(2), . . . , 324(W) associated with each file 310(1)-(R).

Therefore, when the client computing device 104 receives a request for a particular recipe name from the distribution server, the module 114 may check to see if that recipe name has already been cached. If so, then the module 114 may determine (with reference to the timestamp 324(1)-(W)) whether or not the file itself has changed since the time that the hash module 114 created the recipe name. If not, then the communication module 302 simply provides the cached recipe name. If the file has changed, however, then the utility coprocessor client module 114 re-computes and caches the recipe name before sending the recipe name to the distribution server 128.

Example Flow Diagrams

FIGS. 4-8 comprise a flow diagram illustrating an example process 400 for enabling a client computing device 104 running a client-side application 110 to efficiently leverage a server pool 116 over a relatively high-latency, low-bandwidth network 118 utilizing the architecture 100 of FIG. 1. Here, the client computing device 104 limits the number of round-trip communications by providing a pre-throw list 322 of files that the distribution server 128 has previously requested at least twice.

Process 400 includes an operation 402, at which point the client computing device 104 sends a request to perform a particular task to the distribution server 128 of the server pool 116. As discussed above, the requested task comprises a task for a client-side application that the client computing device 104 would execute itself, if not for the described techniques. At operation 404, the distribution server 128 receives the request and begins to attempt to execute the task. For instance, the server 128 sets up a portion of the file system (e.g., file system 210) for future operations performed while processing the request at operation 406.

At operation 408, the distribution server 128 realizes that the processing of the request requires a file that the server 128 does not currently store. As such, the server 128 pauses execution of the task and either requests the file or requests an identifier of the file. For instance, the server 128 may request a recipe name of the file as discussed above. At operation 410, the client computing device 104 receives the request and logs the request in the log 320 of FIG. 3.

If the client computing device 104 does not currently store this recipe name (or if the corresponding file has changed since the last time that the device did compute and cache the recipe name), then the device 104 creates the recipe name. That is, the device 104 divides the file into blocks (e.g., via RDC techniques) and computes a hash of each block at operation 412. At operation 414, the client assembles these hashes into a recipe and computes a hash of the recipe to create the recipe name. In addition, the client computing device 104 stores (e.g., caches) this recipe name in association with this version of the file and sends the recipe name to the distribution server 128 at operation 416. Next, at operation 418, the distribution server 128 receives and stores the recipe name.

Figure 5:
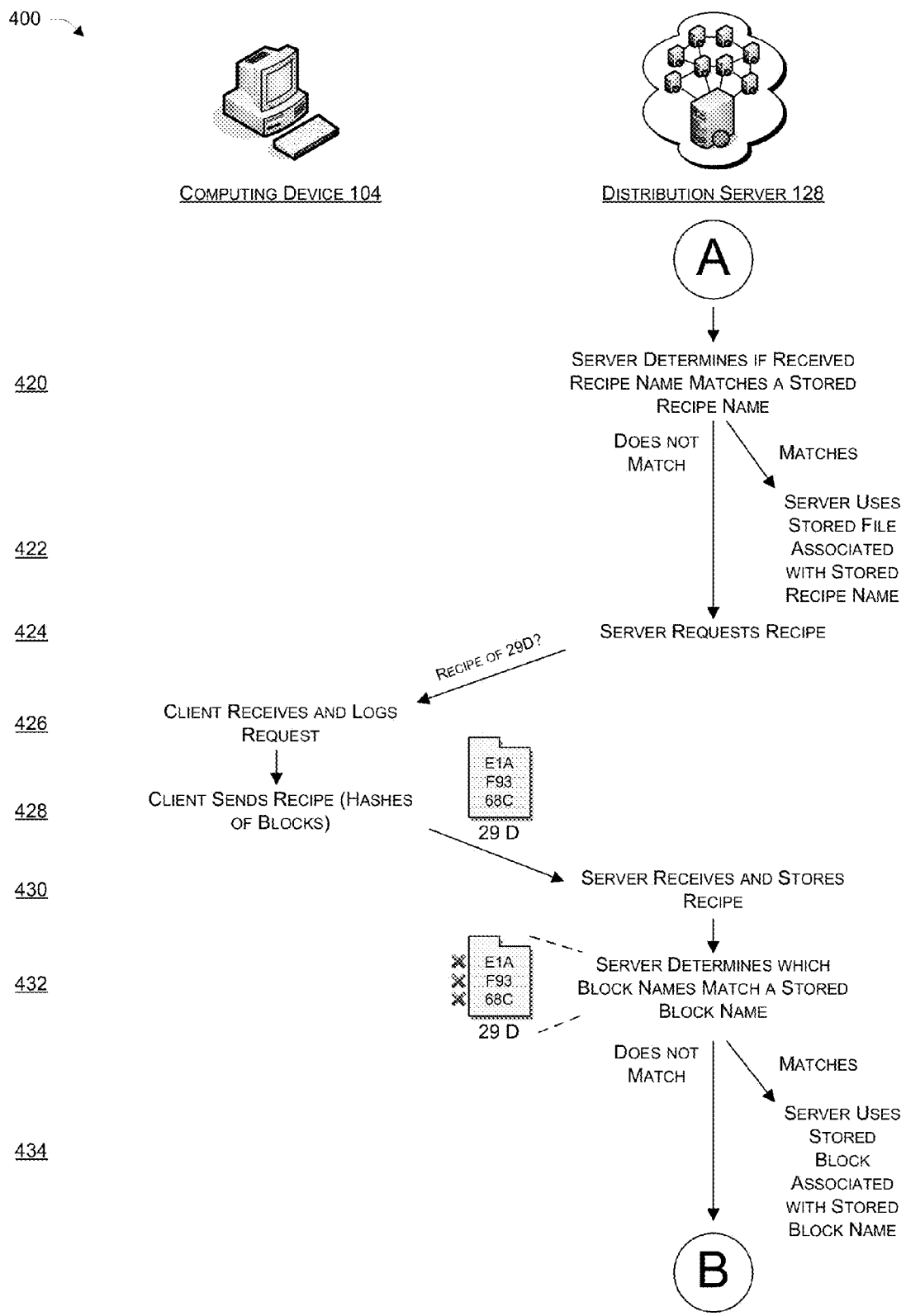

FIG. 5 continues the illustration of the process 400, and includes the distribution server 128 determining if the received recipe name matches a stored recipe name at operation 420. If so, then at operation 422 the distribution server 128 uses the stored file associated with the stored recipe name and continues execution of the task requested by the user of the client computing device 104. If, however, the distribution server 128 does not find a stored recipe name that matches the received recipe name, then the server 128 requests the actual recipe at operation 424.

At operation 426, the client computing device 104 receives and logs the request for the recipe. Next, the client determines and sends the recipe to the distribution server 128 at operation 428. At operation 430, the distribution server 128 receives the recipe and, at operation 432, determines (for each block name of the recipe) whether the distribution server 128 stores a matching block name. For those block names having matches on the server, the server uses the blocks associated with those block names at operation 434.

Figure 6:
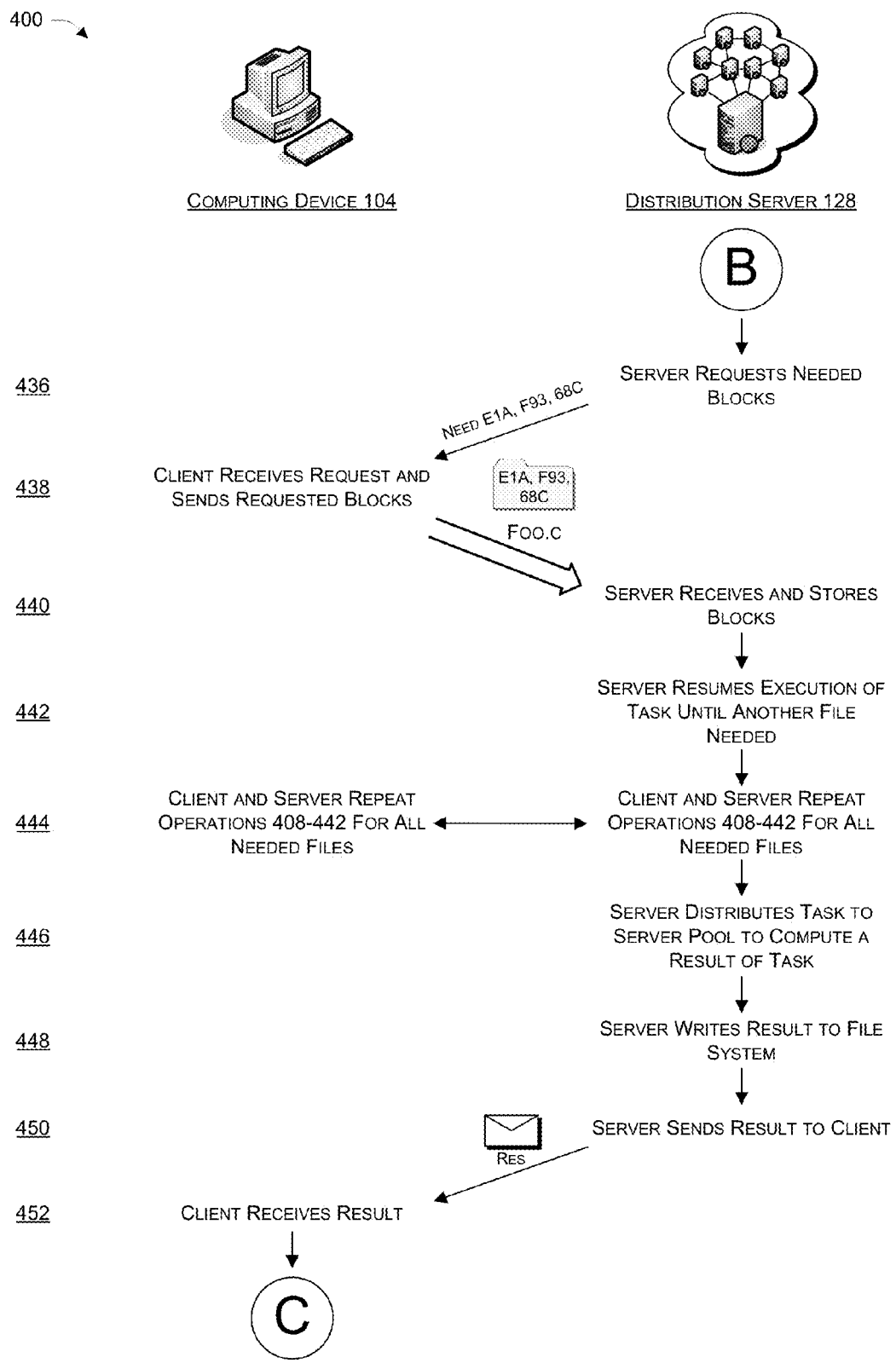

FIG. 6 continues the illustration of process 400 and includes operation 436, at which point the server 128 requests the actual contents of those block(s) for which the server does not currently store matching block names. In response, the client computing device 104 receives the request and sends the requested block(s) at operation 438. As the reader appreciates, previous to this operation the client and the server have simply exchanged hash values, which are very small in size. At this point, however, the client needs to actually send data underlying a portion of these hash names, which is much larger in size than a simple hash name. Specifically, the client 104 sends those blocks of the file that distribution server 128 has determined it does not have. When the server 128 contains "cold caches" (that is, during a first request by a user), the server 128 will likely request to receive multiple files and blocks. As the user continues to request that the server pool 116 perform certain tasks, however, the techniques described above will very likely substantially limit the size of communications between the client 104 and the server 128.

At operation 440, the distribution server 128 receives and stores the blocks. Next, the server resumes execution of the requested task at operation 442 until such time that the server 128 needs another file. At this point, the client and the server repeat operations 408-442 for each needed file, as operation 444 represents.

At some point during this process, the distribution server 128 distributes the task, as well as received application code and data, to one or more other servers of the server pool 116 in order to invoke this massively-parallel computation of a result for the requested task. This may involve, for instance, dividing the task into multiple sub-tasks and providing each of these sub-tasks to a respective server for computation of a result of this sub-task. After achieving the result, each server may provide the result to the distribution server 128. Operation 446 represents this action, while operation 448 represents that the server 128 writes the aggregated result to the assigned file system 210. Next, operation 450 sends the result to the client device 104, which receives the result at operation 452.

Figure 7:
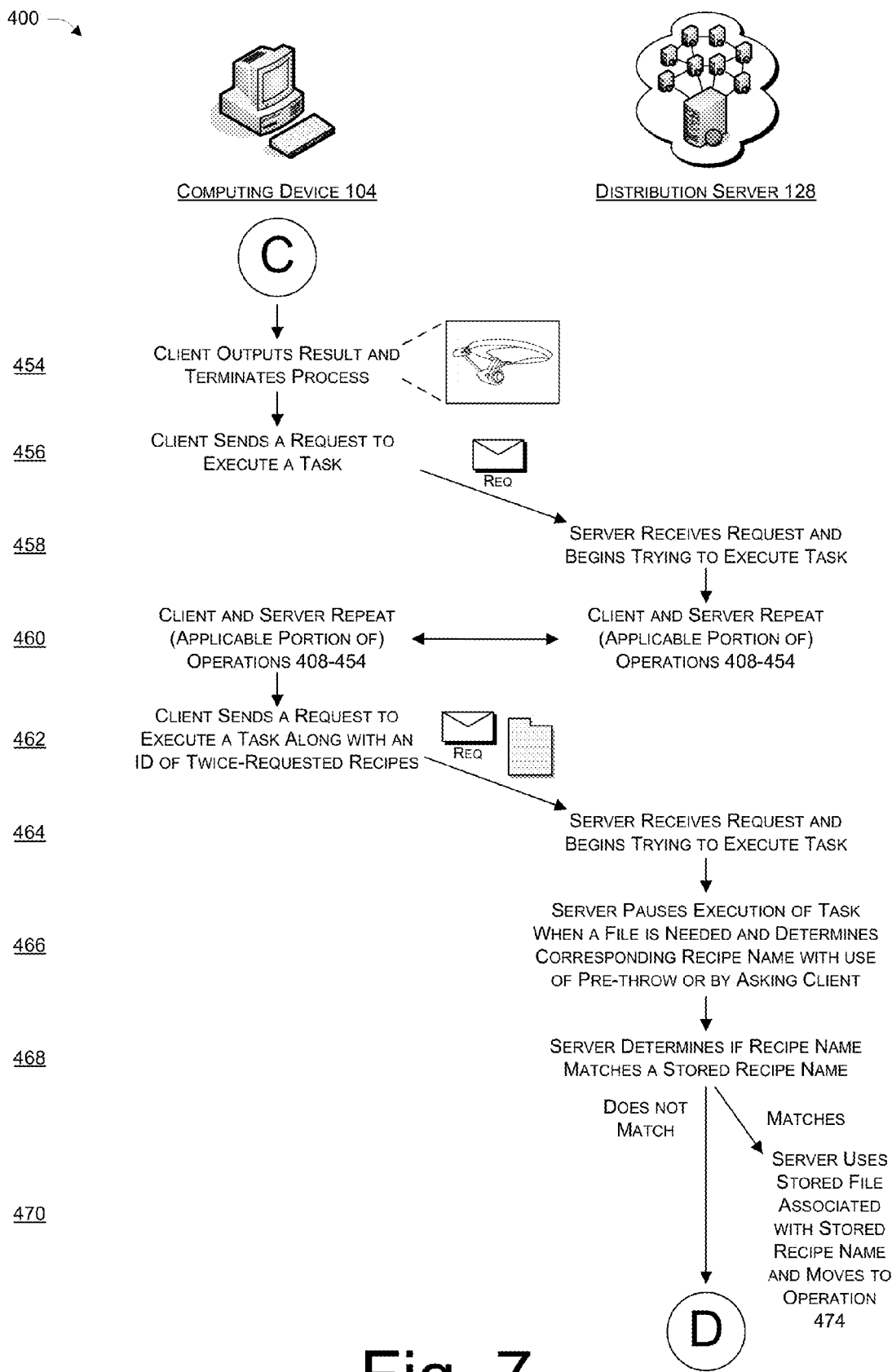

FIG. 7 continues the illustration of process 400 and begins with the client computing device 104 outputting the result of the requested task. Using the example of FIG. 1, the device 104 of the user 102 may output a rendering (created by the server pool 116) of the drawing created by the user 102 on the client display 112.

Operation 456, meanwhile, represents that the user 102 again invokes the server pool 116 to rapidly accomplish a specific task for the application 110 stored on the client device 104. Here, for instance, the user 102 may again choose to render his or her drawing on the client display 112 after the user 102 has continued working on and made changes to the drawing. The distribution server 128 receives this request at operation 458 and begins performing the task. At this point in this implementation, the server 128 and the client computing device 104 repeat operations 408-454 as discussed above at operation 460. For instance, the server and the device likely engage in multiple back and forth communications, cumulating in the server 128 serving a final result of the requested task to the client and the client outputting (e.g., rendering) the result.

Remember that during each of the first two "runs", the client computing device 104 has been logging which recipe names the distribution server has requested during both runs. As such, the client 104 has created a pre-throw list 322 consisting of those recipe names that the distribution server 128 will likely ask for again during a third run.

Operation 462 represents the beginning of the third run, at which point the client computing device 104 sends a request to perform a task along with the pre-throw list 322 identifying those recipe names that the distribution server has twice requested. The distribution server 128 receives the request at operation 464 and begins trying to perform the task. Again, the distribution server 128 pauses execution of the task when a file is needed at operation 466. In addition, the server 128 attempts to determine the recipe name associated with this file by consulting the pre-throw list 322. If the recipe name of the file does not appear on the pre-throw list 322, then the server 128 asks the client for the recipe name using the techniques discussed above.

In either instance, once the server 128 determines the recipe name associated with the file, the server determines if it stores a matching recipe name at operation 468. If so, then at operation 470 the server 128 uses the file associated with the stored recipe name and the process 400 moves to operation 474 (discussed below), if not, then the process 400 proceeds to FIG. 8

Figure 8:
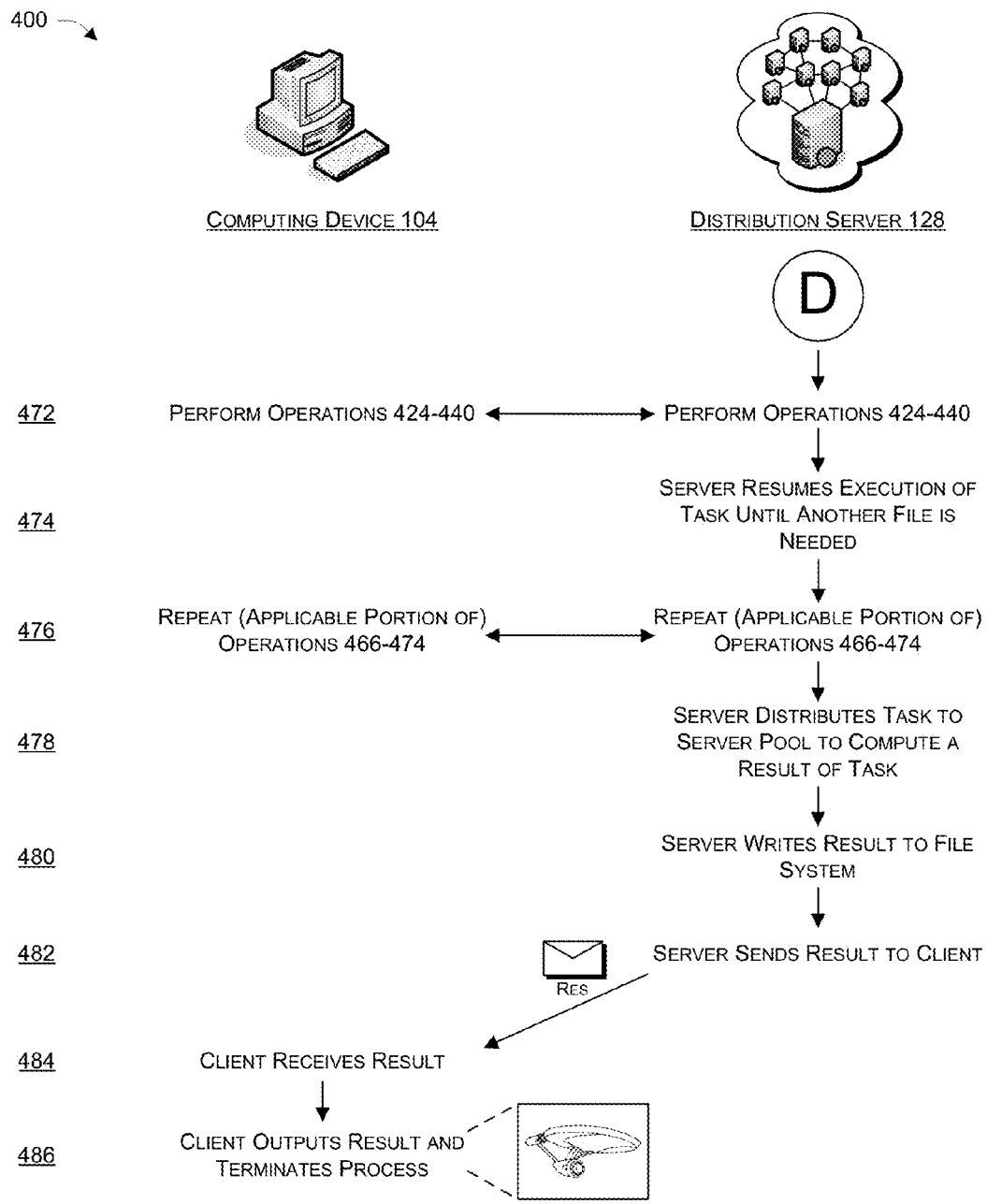

FIG. 8 continues the illustration of process 400 and begins with operation 472, which represents performing the operations of 424-440 in the event that the needed recipe name does not match a stored recipe name. Next, after the server has somehow located or received the needed file, the operation 474 represents that the server 128 resumes execution of the task until another file is needed. Again, the process then repeats the applicable portions of operations 466-474 for each needed file at operation 476.

As the reader will appreciate, the pre-throw list 322 that the device previously provided will drastically and beneficially limit the number of round-trip communications between the client and the server. In addition, because the server has been storing the files and blocks during the previous two runs, the techniques also drastically and beneficially limit the size of those communications that do occur between the client and the server.

Next, at operation 478 the distribution server 128 again distributes the requested task, application code and application data to servers of the server pool 116 for the computation of a result. After receiving and aggregating these results, the distribution server 128 writes the result of the task to the file system 210 at operation 480. At operation 482, the server sends the result to the client, which receives the result at operation 484. Finally, at operation 486 the client computing device 104 outputs the result and terminates the process. The process 400 could continue, with the client computing device 104 constantly updating the pre-throw list to, for example, include those recipe names that are at least twice requested or based on other factors that indicate that the server 128 will likely need the recipe name during a particular run.

Figure 9:
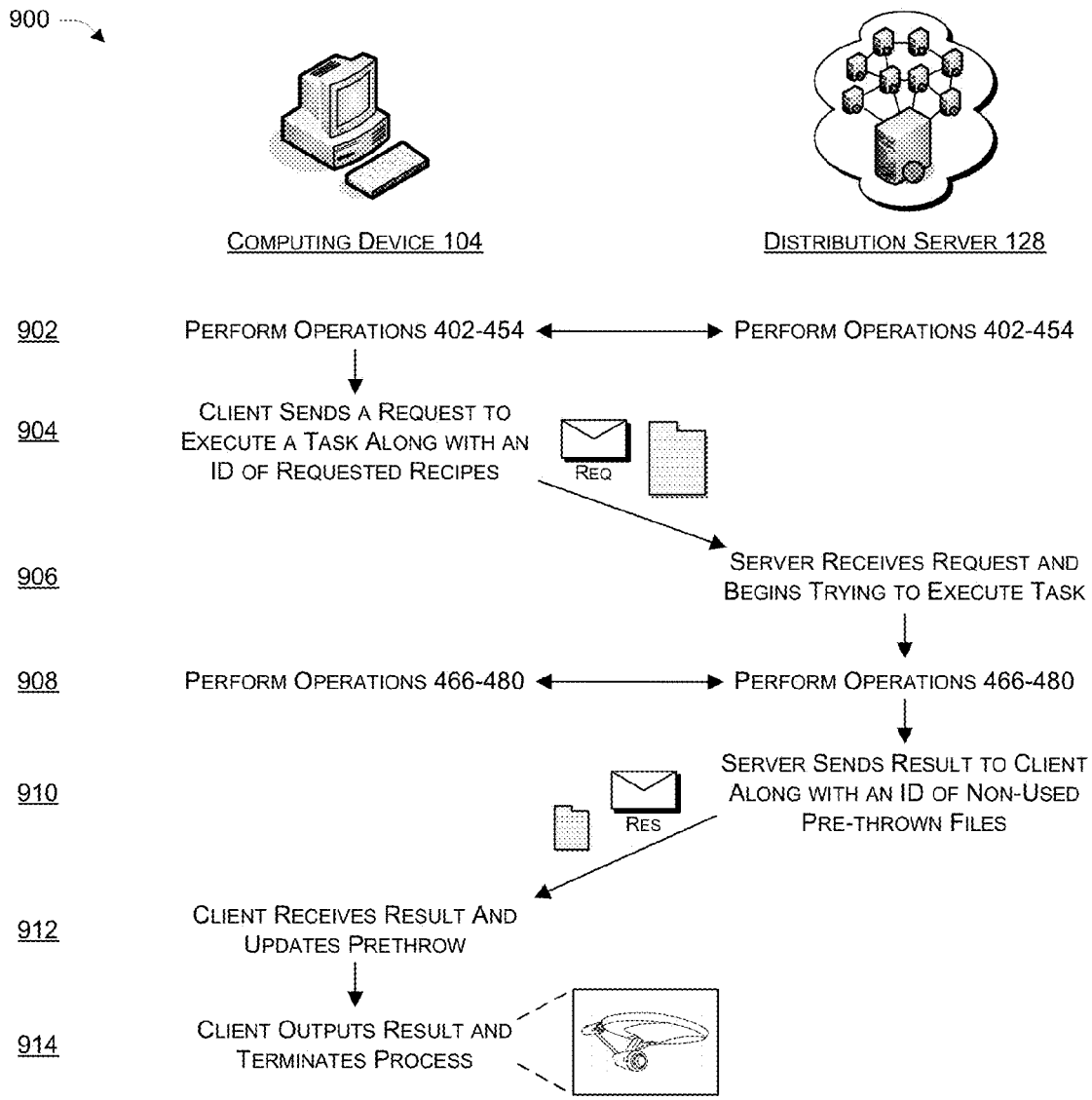
FIG. 9 comprises a flow diagram illustrating another example process for enabling the client computing device running the client-side application to efficiently leverage the server pool over the high-latency, low-bandwidth network utilizing the architecture of FIG. 1. Here, the client computing device limits the number of round-trip communications by providing a list of files that the server has previously requested. In this process, the distribution server notifies the client of the identified files that the server did not need to compute the result of the requested task.

FIG. 9 comprises a flow diagram illustrating another example process 900 for enabling the client computing device 104 running the client-side application 110 to efficiently leverage the server pool 116 over the high-latency, low-bandwidth network 118. Here, the client computing device 104 limits the number of round-trip communications by providing a list of files that the distribution server 128 has previously requested once. In this process, the server 128 notifies the client 104 of the identified files that the server 128 did not need to compute the result of the requested task.

Process 900 begins with operation 902, which represents that the client 104 and the server 128 perform the operations 402-454 previously illustrated and described above. Briefly, these operations comprise the client 104 and the server 128 engaging in one entire run, from the requesting of a task to the outputting of a result.

Operation 904, meanwhile, begins the second run. Here, the client computing device 104 sends a second request to perform a task to the server 128 along with the pre-throw list 322 including those recipe names that the server 129 requested during the first run. At operation 906, the distribution server 128 receives the request and the pre-throw list 322 and begins trying to perform the requested task. At operation 908, the client 104 and the server 128 perform the operations of 466-480, as described and illustrated above.

Next, the server 128 sends the result of the requested task to the client at operation 910. In addition, the server 128 also sends an indication of those files (or recipe names) included on the pre-throw list that the distribution server did not use. At operation 912, the client computing device 104 receives the result along with the identifications of the unneeded files. At this point, the client computing device 104 may update the pre-throw list 322 by removing one or more of the identified files from the list. As discussed above, however, different implementations may remove (and add) files to the pre-throw based on varying thresholds. In any event, operation 914 represents that the client computing device 104 again outputs the received result and terminates the process.

Example Processes

Figure 10:
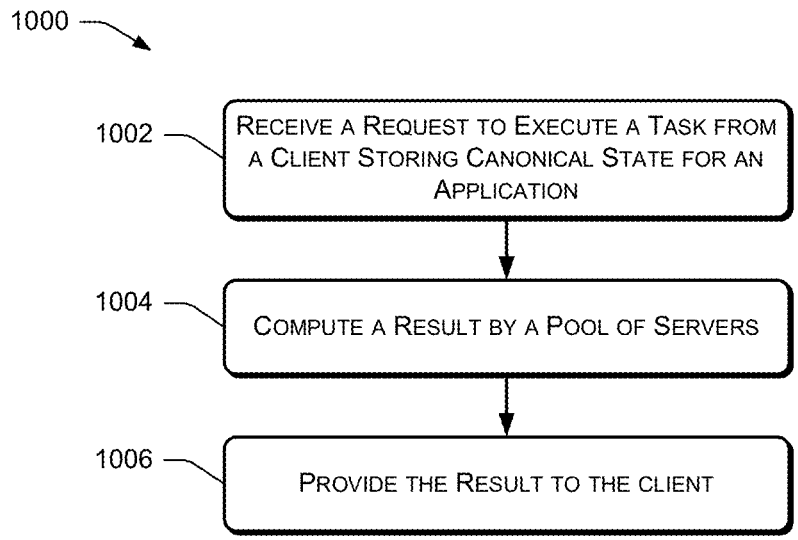
FIGS. 10-12 are flow diagrams of example processes for enabling a client computing device to leverage remote server-pools for increasing the effectiveness of client-side applications with use of the techniques described herein.
Figure 11:
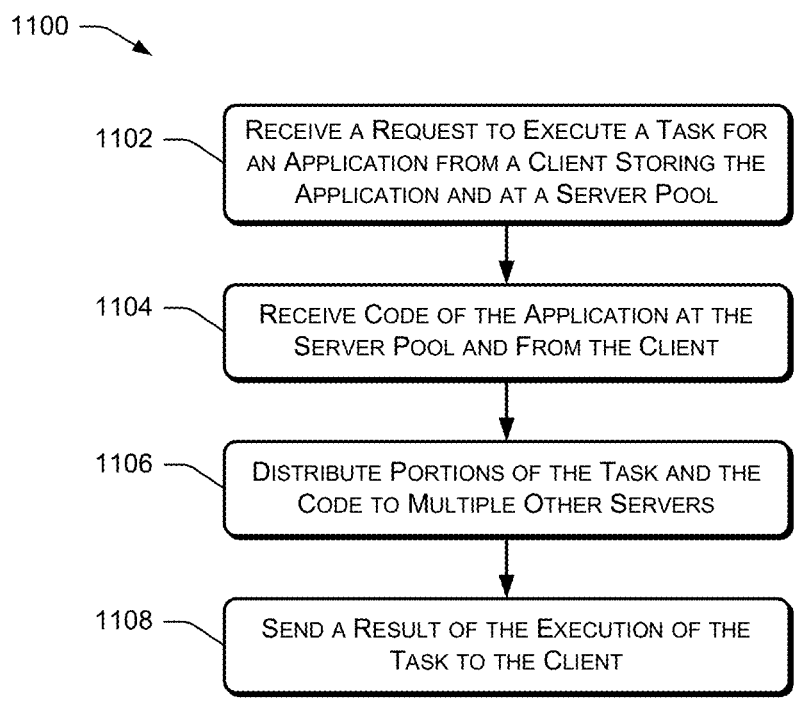
Figure 12:
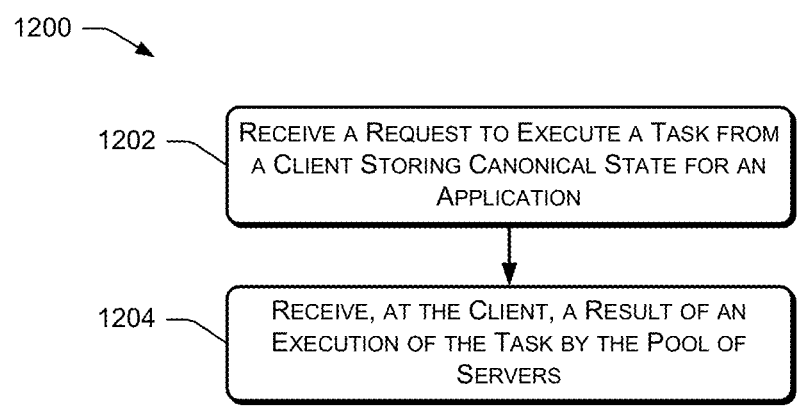

FIGS. 10-12 are flow diagrams illustrating example processes 1000, 1100, and 1200 for enabling client computing devices to leverage remote server pools for increasing the effectiveness of applications stored on the client computing device. Each of these processes is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein.

FIG. 10 illustrates process 1000, and includes receiving, from a client computing device and at a pool of servers, a request to execute a task for an application whose canonical state resides on the client computing device at operation 1002. In some instances, the request is received over a network that has a substantially higher latency or a substantially lower bandwidth than a network connecting servers of the pool of servers. Next, operation 1004 represents computing a result of the task by the pool of servers, while operation 1006 provides the result to the client computing device for output by the application whose canonical state resides on the client.

FIG. 11 illustrates process 1100 and includes receiving, over a first network and at a server of a pool of servers interconnected by a second network, a request from a client computing device to execute a task for an application stored on the client computing device. Next, operation 1104 represents receiving, over the first network and at the server, code of the application from the client computing device.

Operation 1106, meanwhile, represents distributing, by the server and to multiple other servers of the pool of servers, portions of the task and portions of the code of the application for processing by the multiple other servers. Finally, operation 1108 represents sending a result of the execution of the task from the server and to the client computing device over the first network.

Finally, FIG. 12 illustrates process 1200. This process includes operation 1202, which represents sending, from a client computing device and to a pool of servers, a request to execute a task for an application whose canonical state resides on the client computing device. In some instances, the request is sent over a network that has a substantially higher latency or a substantially lower bandwidth than a network connecting servers of the pool of servers. Next, an operation 1204 represents receiving a result of the execution of the task at the client computing device and from the pool of servers at least in part in response to the sending of the request.

Additional Details of Example Techniques

As described above, the described techniques harness the power of large-scale utility computing (i.e., server pools or clouds), making these resources available via a simple interface to enhance the interactive performance of a variety of applications, including client-side applications. To do so, the techniques described above and below largely overcome the low available bandwidth and high latency typical of clients' connections to the utility computing service (e.g., server pool 116). The techniques also deal with heterogeneous configuration among different clients while achieving six to eleven times speedups (e.g. 6-11 times traditional techniques) on some desktop applications, such as video editing applications, photorealistic rendering applications, strategy game applications and the like. Of course, when applying these techniques to other applications, the speedup could be much more (e.g., 10×, 20×, 100×, etc.) or even less (e.g. 1.5×, 2×, etc.). Furthermore, the techniques call for only minor modifications to the original applications. For context, these speedups are capable of improving performance from the coffee-break timescale of minutes to the scale of fifteen to twenty second interactive performance.

As discussed above, these techniques convert application software into an interactive, scalable cloud service targeted at exactly one user. This goal entails four requirements: (1)

configuration transparency, meaning that the service matches the user's application, library, and configuration state; (2) noninvasive installation, meaning that the techniques work with a user's existing file system and application configuration; (3) application generality, meaning that a developer can easily apply the system to any of a variety of applications, and (4) ease of integration, meaning that implementation of the techniques can be done with minimal changes to the application.

The techniques described herein achieve all these goals. To guarantee that the server pool 116 uses exactly the same inputs as a process running on the client 104, the system faults in every data file, application image, and library binary. The application extension is a simple user-mode library which can be easily and non-invasively installed. The generality of the techniques, meanwhile, is demonstrable by the fact that they can apply to the diverse application areas of 3D modeling, strategy games, and video editing. In one specific example, users can exploit a 32-node server pool with a 295-line patch to a video editor, which transforms three-minute batch workflow for video compositing into a fifteen-second interactive WYSIWYG display.

In many instances and as described above, one challenge in leveraging the server pool 116 for desktop applications, such as client application 110, stems from the client 104 being separated from the server pool 116 by the high-latency, low-bandwidth network 118. To reduce latency penalties, the techniques carefully relax the file consistency contract and use automatic profiling to send cache validation information to the server before it is needed, via the pre-throw list 322. To reduce bandwidth penalties, meanwhile, the techniques use remote differential compression (RDC) in the manner laid out above. Finally, a library-level multiplexer on the server-pool end of the link scales the effects of these techniques across many servers.

Programming Model

As discussed immediately above, the techniques described above implement a programming model having the following qualities: simplicity for developers, generality across applications and operating system configurations, and excellent performance over slow links.

One of the mechanisms that the techniques use to achieve these goals is location independence: applications, such as the client application 110 from FIG. 1, can launch remote processes, each of which has the same effect as if it were a local process. Suppose an application's work can be divided among a set of child processes, each of which communicates with the parent through the file system or standard I/O. The utility coprocessor client module 114 from FIG. 1 provides a command-line utility (in this example, "remrun") that looks like a local worker process, but is actually a proxy for a remotely running process. A simple change from exec("program—arg") to exec("remrun program—arg") provides the same semantics to the client application 110 while offloading the compute burden from the client central processing unit (CPU).

In addition, the described techniques employ the following consistency contract: each child process is guaranteed to see any changes committed to the client file system before the child was launched, and any changes it makes will be committed back to the file system before the child terminates. Thus, dependencies among sequential children, or dependencies from child to parent, are correctly preserved. This consistency contract may be referred to as task-end-to-start consistency semantics. Because this contract applies to the entire file system, remote processes see all the same files as local client processes, including the application image, shared library binaries, system-wide configuration files, and user data.

When "remrun" is used to launch a proxy child process, it transmits an exec message to the cluster (e.g., server pool 116) that includes remrun's command line arguments and environment variables. The cluster picks a worker node and launches a worker process with the specified arguments, chrooted into a private namespace managed by the daemon of the system. On each read access to an existing file, the system faults the file contents from the client 104; on each write to a non-existing file name, the system creates the file in a buffer local to the node's file system. To prevent violations of task-end-to-start semantics from failing silently, the system disallows writes to existing files. Standard input and output are shuttled between the client proxy process and the cluster worker process. When the worker process exits, the system sends any surviving created files to the client 104, as discussed and illustrated above. It also sends the process exit status; the client proxy process exit( )s with the same status.

An example best illustrates how these techniques provide location independence. When compiling a single source file, the system's remrun gcc hello.c produces an output file identical to a locally run gcc hello.c, because the remote version:
  has the same search-path ($PATH) as the client 104, sees the same directory contents, and so uses the same version of gcc;
  sees the same environment, including $LD LIBRARY PATH (run-time configuration for shared library loading) and $LANG (localization);
  runs gcc in the same working directory, and thus finds the correct hello.c;
  finds the same compiler configuration and system include files; and
  deposits its object file into the client file system when it exits, producing output in the same place and with the same permissions as if the process had run locally.

Contrast this approach to other remote execution systems. Application-specific clusters such as compile and render clusters must be configured with a version of the compiler or renderer that matches that on the client. Grid and utility computing clusters standardize on a configuration, requiring the client configuration to conform. Previous process migration systems assume that user and worker machines are part of a single, homogeneous cluster. They typically use a network-shared file system for user data (e.g., /home), but assume uniformity of the system configuration (e.g., /usr) across machines. Identical configurations are required, for example, so that a dynamically linked executable built on a user's machine can find the expected shared libraries when it executes on the cluster. The techniques described above and below are meant to be used by disparate independent users. No single configuration is ideal; various users (e.g., user 102 and users 126) sharing a cluster (e.g., server pool 116) may have conflicting configurations. The semantics presented here hide these conflicts. Each worker process mimics the respective client computer, and a single cluster may do so simultaneously across users and applications. In addition, different Linux® distributions can transparently use the same cluster without any explicit pre-configuration. In one example, the example cluster (or server pool), which happens to use GNU libc 2.3.6, never exposes its own libraries to client applications.

Limitations on Location Independence

The location independence that the described techniques provide extends to the file system, environment variables, process arguments, and standard I/O pipes. Therefore, programmers adapting an application need to be aware of the limitations on location independence. Fortunately, this is not an impediment to adapting a variety of applications with minimal modification.

One potential limitation of the described system in some implementations is that the system does not support inter-process communication other than standard I/O pipes. This precludes tightly-coupled computations in which concurrent child processes synchronize with each other using other forms of IPC such as shared memory, signals, or network or local pipes.

Another limitation, in some instances, is that the kernel services seen by a remotely running process are that of the remote worker machine, not the client computing device 104 of the user 102. This is important both in the semantics of system calls, as they change slightly from version to version, and the resources that the kernel makes available such as access to "local" devices. The described techniques hide most /dev and /proc services, to encourage kernel-dependent applications to fail quickly. It does expose a few commonly-used pseudo-devices such as /dev/null and /proc/self; the latter supports commonly-used idioms for finding loadable modules using a path relative to the currently executing image's path. Finally, regular files on the client computing device 104 appear on the remote machine as symbolic links to files named by a hash of their contents. This, however, has little effect on most programs in practice.

Minimizing Round Trips

The techniques described immediately above provide a system model with semantics suitable for a large class of client applications. A straightforward implementation, however, would likely perform poorly on a typical high-latency, low-bandwidth last-hop network link, such as on the network 118 of FIG. 1. As such, the techniques described herein address the problem of using that link efficiently by minimizing round-trip and bandwidth costs, as discussed in detail above. One technique for providing reasonable performance is to cache file contents near the cluster or server pool. The classic question is how to ensure that cached content is fresh. Neither frequent validation nor leases are overly compatible with requirements of the described techniques.

Pre-Throw:

Consistency semantics require that, for each path a worker touches during its run, the techniques communicate the mutable binding from path to file attributes and content. Note that path names are accessed bi-modally. That is, almost all path names requested by an invocation of a given application are libraries, binaries, and configuration data touched by every invocation of the application; none or only a few path names change every time. Rather than wait for the worker to request validation information for each path serially, the client computing device 104 sends a batch of validations to the cluster (e.g., the server pool 116) preemptively at the beginning of the execution. As discussed above, the client 104 maintains sets of accessed paths, indexed by the first argument to exec. Furthermore, in one implementation the techniques pre-throw those paths that have been accessed more than once. This restriction avoids accumulating in the set an ever-growing list of every temporary path name ever referenced. One potential limitation of indexing path history by executable name is that it does not distinguish between two very different programs invoked via the same interpreter (exec("python", "prog1" . . . )), unless the interpreter is implied from within the program with a "shebang" (#!) rather than explicitly as the first exec argument. Because pre-throws are compact (and cache-able), this is likely not a problem in practice.

Minimizing Bandwidth

As mentioned earlier, in a bandwidth-constrained environment, caching is critical. The techniques described above refer to caching by immutable hash, so that if an equivalent block of data is referred to by multiple names the client computing device 104 only has to transmit the block once and the distribution server 128 only has to cache the block once.

Remote Differential Compression:

Whole-file caching works well for files that change rarely, such as application binaries, shared libraries, and static configuration files. However, for certain applications, input files often change slightly between invocations or runs. For example, a video editor's edit decision list (EDL) is a compact representation of the user's proposed manipulations to a set of input video files that remain read-only; this EDL changes slowly, at keyboard and mouse bit rates. When only a small part of a file changes like this, remote differential compression (RDC) is useful, as discussed above. This mechanism detects which parts of a file are already cached and transmits only a small region around each changed part.

For each file, the rsync fingerprint algorithm breaks file contents at offset-insensitive block boundaries. This allows the techniques to construct a Recipe for the file: a list of all the block hashes, plus the file's mode and permissions fields. This recipe can be quite large, so the techniques may compactly refer to it by its hash, labeled a recipe name.

In one implementation, the described system rolls whole-file caching and RDC into a single mechanism. Given a path, the distribution server 128 first resolves it to a recipe name, either from a pre-thrown binding, or by requesting it from the client computing device 104. If the distribution server 128 recognizes the recipe name, the server 128 knows that it already has the whole file cached and needs nothing further from the client computing device 104. Otherwise, it requests the recipe, and then any blocks from that recipe that the server lacks.

Stream Compression:

Naturally, the techniques can further reduce the cost of transmitting the changed bytes themselves with conventional stream compression. In some implementations, the described system compresses its channels with zlib.

Cache Sharing:

Multiple worker processes nearly always share data, such as the application binary or C library. It is wasteful for the client to send this data to each worker over its bottleneck link. Cluster nodes (or "servers of a server pool") are interconnected with a high bandwidth network, so it is better to have the client send the data to one cluster node and thereafter to have them communicate it to each other.

Therefore, the system introduces a distributor node (e.g., the distribution server 128) within the cluster (e.g., the server pool 116), called "remdis". The remdis node has a pass-through interface, which accepts jobs from the client as if it comprised every cluster node, and submits jobs to workers as if it were the client. The remdis node forwards messages in both directions, multiplexing multiple requests from clients to separate cluster nodes.

Because recipe names and content block hashes describe immutable content, remdis can safely interpose its own cache, intercepting duplicate requests to the client and broadcasting results to the cluster nodes. The shared cache ensures no unique block is sent more than once over the client's constrained access link.

In some instances, a single remdis (e.g., a single distribution server 128) may bottleneck at around 64-128 nodes or servers dependent there from. Because of its simple interface, however, the techniques enable creation of, for example, a 32-wide tree of remdis nodes to extend the distribution function to higher scales.

Job Consistency:

Computing and sending a pre-throw message takes valuable time. Specifically, it takes time to look up the modification times of hundreds of files on the client, and time to transmit a few tens of KiB across the constrained client access link. Sending n tasks incurs these costs n times. On the other hand, using the same pre-throw message for all tasks would incur one computation and one transmission, after which remdis would broadcast the message to the cluster, reducing associated costs by a factor of n.

Unfortunately, reusing a single pre-throw message violates certain consistency models. If a file changes between task A's launch and task B's launch, but task B uses task A's pre-throw message, it will see the incorrect old file version. Fortunately, this is no problem for many applications: they launch a large batch of concurrent tasks (a job), and make no changes to the file system during the launch of tasks within the same job. Such applications would be satisfied with job-end-to-start consistency semantics: each task sees any changes committed to the client file system before its enclosing job was launched. Therefore, the described system allows applications to group tasks into jobs with these semantics. The system then generates the pre-throw once for the entire job.

Client-Side Optimizations

The following two optimizations may be performed on the client computing device 104 and thus involve no changes to the protocol.

Recipe Caching:

Constructing a Recipe on the client is typically fast. However, sometimes hundreds or thousands are required, and knowing the recipe for every path on the pre-throw list is on the critical path for every task. Thus, the client keeps track, for each path, of when it last computed that path's recipe and what it was. When it later needs the recipe for that path, it checks whether the last-modified time of the file is before the associated timestamp, and if so uses the cached value. For one application, this optimization saves the client from hashing 93 MiB of content, saving seconds of computation.

Thread Interface:

The remrun command-line utility lets applications divide their work in a natural way, creating what seem to be local worker processes but are actually proxies for remote processes. This elegance makes it trivial to expose remote execution opportunities in systems like make. However, simply launching 32 or 64 local processes can take several seconds, particularly on low-end desktop machines. Thus, the techniques have added a remrun( ) library interface. A client that wants n remote processes can spawn n threads and call remrun( ) from each; the semantics are identical to spawning instances of the command-line version. The library obviates the need for extra local processes in exchange for a slightly more invasive change to the application.

SUMMARY

In the common case, the techniques described here incur four round trips: the necessary one, plus three more to fault in changed user input. The techniques also use bandwidth sparingly. For instance, one implementation of the techniques upload only one copy of the path attributes required by the consistency model, described above, the per-task parameters with duplication compressed away, and the changed part of the job input; it also downloads only the output data and the exit codes of the tasks.

Together, these optimizations compose an algorithm that attaches to application code with a simple interface, yet minimizes both round trips and bandwidth on the high-latency, low-bandwidth link, such as the network 118 from FIG. 1. As such, the described system effectively transforms software not originally designed for distributed computation into an efficient, highly parallel application service targeted at a single user.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more computer devices comprising:
   one or more processors;
      one or more computer-readable media storing computer-executable instructions that, when executed, cause one or more processors to perform acts, comprising
      receiving, from a client computing device and at a pool of servers, a request to execute a task for an application whose canonical state resides on the client computing device, wherein the request is received over a network that has a substantially higher latency or a substantially lower bandwidth than a network connecting servers of the pool of servers;
      computing, by the one or more processors, a result of the task by the pool of servers, the canonical state of the application residing on the client computing device throughout the computing by the one or more processors; and
      providing the result to the client computing device for output by the application whose canonical state resides on the client computing device.

2. One or more computer devices as recited in claim 1, wherein the network over which the request is received comprises a Wide Area Network (WAN) and the network connecting the servers of the pool of servers comprises a Local Area Network (LAN).

3. One or more computer devices as recited in claim 1, wherein the computing of the result by the pool of servers comprises:
   receiving the request from the client computing device at a first server of the pool of servers;
   distributing one of multiple sub-tasks of the task to a second server of the pool of servers and another of the multiple sub-tasks of the task to a third server of the pool of servers for computing by the second and third servers, respectively; and
   receiving, at the first server, respective results of the sub-tasks distributed to the second and third servers.

4. One or more computer devices as recited in claim 1, wherein the computing of the result by the pool of servers comprises:
   sending a request to the client computing device for a file required for the computing of the result or for an identification of the file;
   receiving a hash value associated with the file from the client computing device;
   determining if the received hash value matches a hash value stored by the pool of servers; and
   if it is determined that the received hash value matches a hash value stored by the pool of servers, using a file stored on the pool of servers and associated with the hash value stored on the pool of servers for computing the result of the task.

5. One or more computer devices as recited in claim 4, wherein the computing of the result by the pool of servers further comprises:
    if it is determined that the received hash value does not match a hash value stored by the pool of servers:
    sending a request to the client computing device for an identification of multiple blocks that comprise the requested file;
    receiving hash values associated with respective blocks of the multiple blocks from the client computing device;
    comparing the received hash values associated with the respective blocks with hash values stored on the pool of servers; and
    if it is determined that the pool of servers does not store a hash value matching a received hash value for a block, sending a request for the block of the requested file and receiving the request block from the client computing device.

6. One or more computer devices as recited in claim 1, wherein the computing of the result by the pool of servers comprises:
    receiving, from the client computing device, an identification of files previously requested by the pool of servers during a previous execution of a task for the application by the pool of servers.

7. One or more computer devices as recited in claim 6, wherein the computing of the result by the pool of servers further comprises:
    using the received identification of the files until completion of the currently-requested task.

8. One or more computer devices as recited in claim 6, wherein the received identifications of the files comprise hash values associated with the respective files.

9. One or more computer devices as recited in claim 6, wherein the pool of servers has previously requested each of the identified files at least a predetermined number of times during the execution of a requested task.

10. One or more computer devices as recited in claim 6, wherein the computing of the result by the pool of servers further comprises:
    at least in part in response to the receiving of the identification of the files previously requested by the pool of servers, identifying files that the pool of servers does not currently need for computing the result of the task and providing the identification of the unneeded files to the client computing device.

11. A method comprising:
    receiving, over a first network and at a server of a pool of servers interconnected by a second network having a latency that is substantially lower than a latency of the first network or a bandwidth that is substantially higher than a bandwidth of the first network, a request from a client computing device to execute a task for an application whose canonical state resides on the client computing device;
    receiving, from the client computing device over the first network and at the server, code of the application whose canonical state resides on the client computing device;
    distributing, by the server and to multiple other servers of the pool of servers, portions of the task and portions of the code of the application whose canonical state resides on the client computing device for processing by the multiple other servers, the canonical state of the application residing on the client computing device throughout the processing by the multiple other servers; and
    sending a result of the execution of the task from the server and to the client computing device over the first network.

12. A method as recited in claim 11, wherein the first network comprises a Wide Area Network (WAN) and the second network comprises a Local Area Network (LAN).

13. A method as recited in claim 11, further comprising:
    receiving, from the client computing device, an identification of files previously requested by the pool of servers during a previous execution of a task for the application by the pool of servers.

14. A method as recited in claim 11, further comprising:
    sending a request to the client computing device for a file required for the execution of the task or for an identification of the file;
    receiving an identification of the file;
    using the identification of the file to determine if the server has previously received the file; and
    if it is determined that the server has previously received the file, using the file for the execution of the task.

15. A method as recited in claim 14, further comprising:
    if it is determined that the server has not previously received the file, sending a request to the client computing device for an identification of each of multiple blocks of the file;
    receiving an identification for each block of the multiple blocks of the file;
    using the identifications of the multiple blocks to determine if the server has previously received the respective block;
    at least in part in response to determining that the server has previously received a particular block, using the particular block for the execution of the task; and
    at least in part in response to determining that the server has not previously received a particular block, sending a request for the particular block to the client computing device.

* * * * *